UNITED STATES PATENT OFFICE.

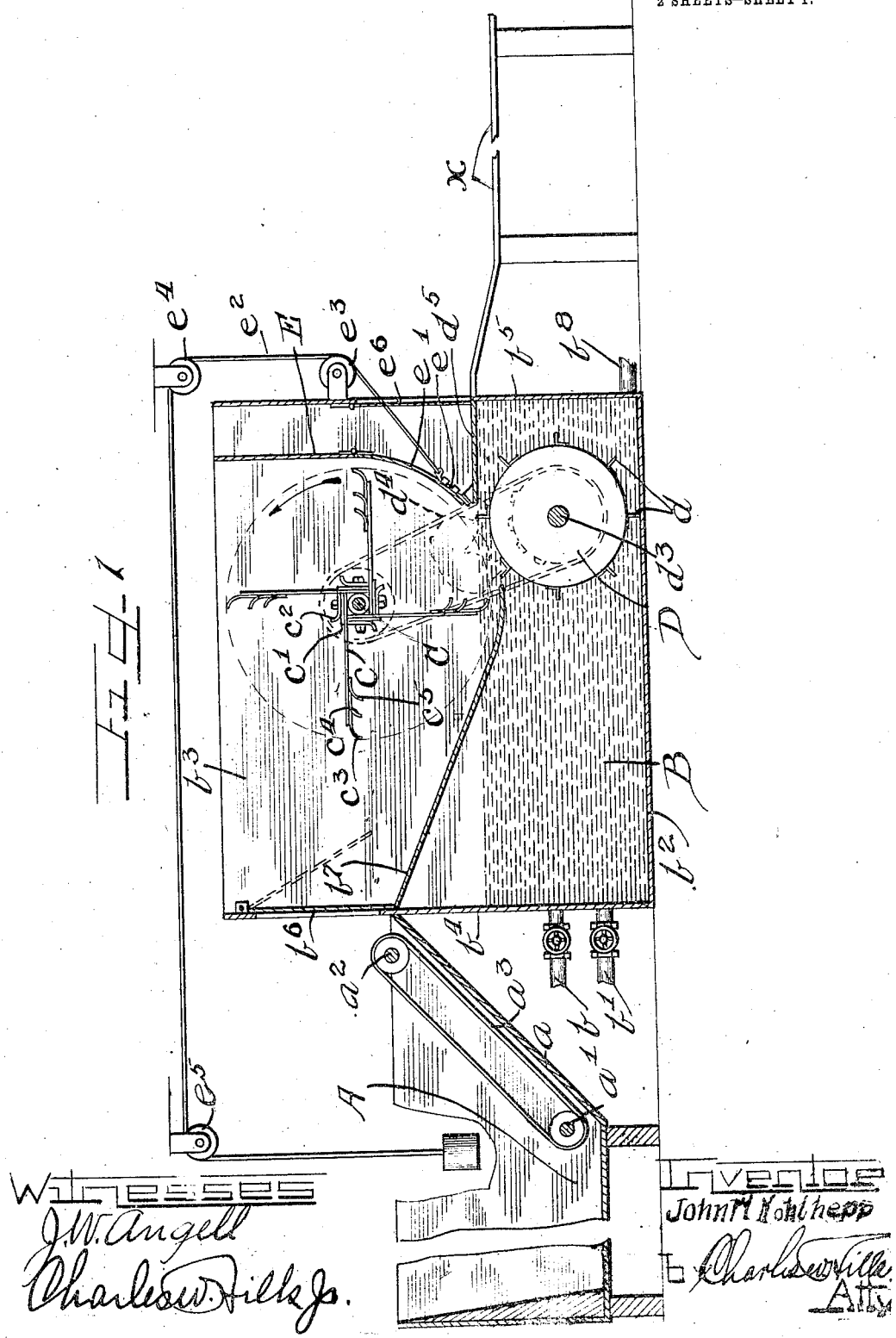

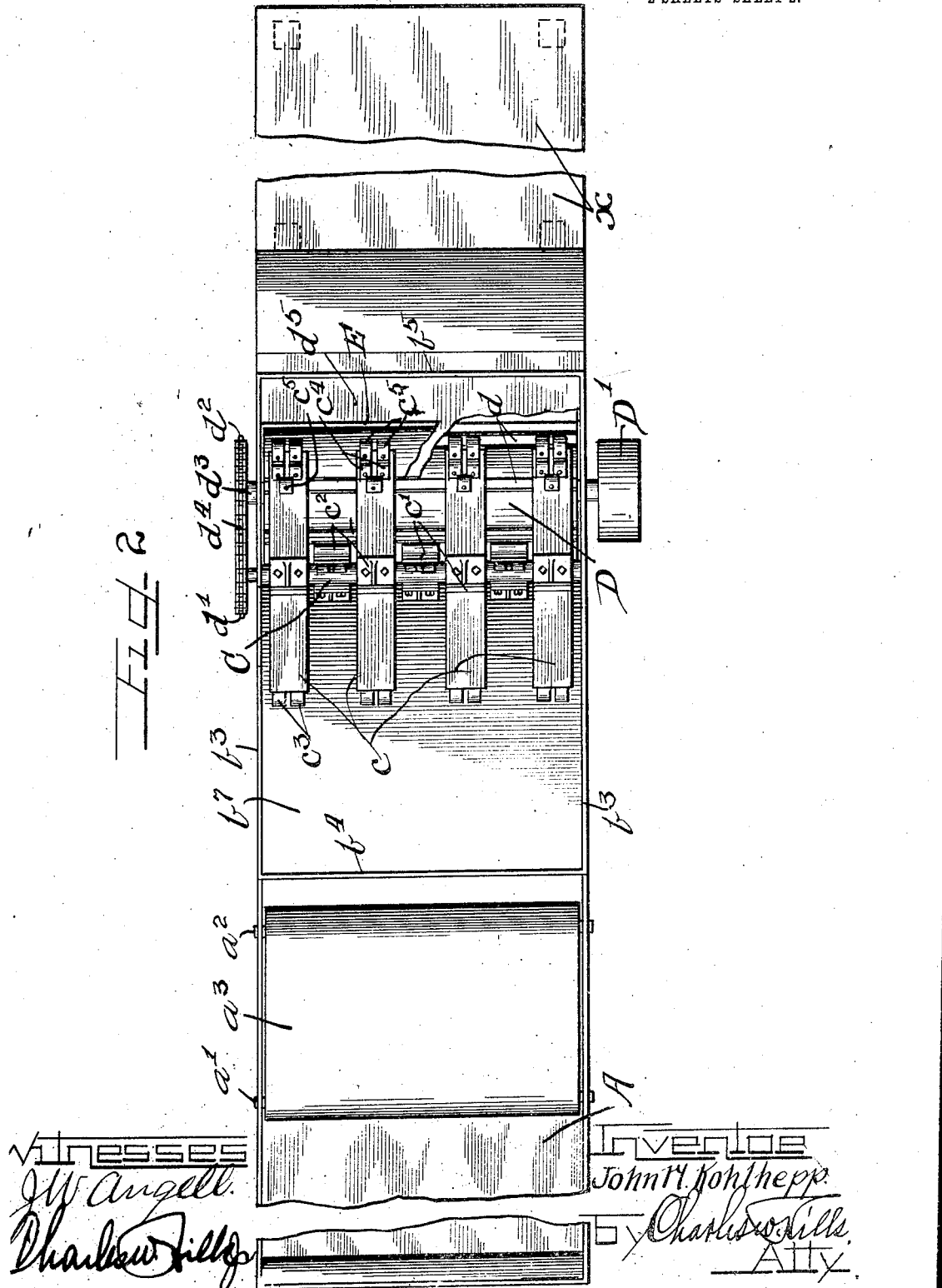

JOHN W. KOHLHEPP, OF CHICAGO, ILLINOIS, ASSIGNOR TO THE ALLBRIGHT-NELL COMPANY, OF CHICAGO, ILLINOIS, A CORPORATION OF ILLINOIS.

CARCASS SCRAPING AND CLEANING MECHANISM.

1,125,561.   Specification of Letters Patent.   Patented Jan. 19, 1915.

Original application filed July 17, 1907, Serial No. 384,287. Divided and this application filed March 23, 1912. Serial No. 685,834.

*To all whom it may concern:*

Be it known that I, JOHN W. KOHLHEPP, a citizen of the United States, and a resident of the city of Chicago, county of Cook, and State of Illinois, have invented certain new and useful Improvements in Carcass Scraping and Cleaning Mechanisms; and I do hereby declare that the following is a full, clear, and exact description of the same, reference being had to the accompanying drawings, and to the letters of reference marked thereon, which form a part of this specification.

The present application constitutes a division of my prior application for patent for carcass scraping and cleaning mechanisms, Serial No. 384,287, filed July 17, 1907.

This invention relates to improvements in scraping mechanisms and particularly to that class adapted for scraping, polishing and cleaning hogs.

Heretofore in carcass scraping machines the carcasses have been supported on or suspended from a suitable conveyer and passed between scraping devices suitably arranged to act thereon. Where the carcasses are supported lengthwise on the conveyer there has always been a strip extending the entire length the carcass that could not be acted upon by the scraping mechanism and in that class of machine in which the carcass is suspended by hooks there is always a portion where the hook engages that is not scraped. Furthermore machines employing conveyers which necessitate carriages and hooks being used for engaging the carcasses are quite expensive to install, require considerable space, constantly need repairing and consist of a multiplicity of parts.

It is an object of this invention to provide a construction in which mechanism is provided capable of both conveying the carcasses past the scrapers and constantly rotating the same simultaneously for exposing all parts to the action of the scrapers and in which the use of hooks for engaging the carcasses can be dispensed with.

Also the hog scraping mechanisms heretofore have only been adapted to clean the carcass and have not in any way aided in forcing the carcasses through the machine.

It is an object of this invention to provide a carcass scraping machine in which the use of a conveyer necessitating the use of hooks and carriages is eliminated.

It is a further object of this invention to provide a machine in which the carcasses are moved past the scrapers at the desired rate or may remain in one place in the machine until completely cleaned and in which the carcasses are continuously rotated or turned, thereby exposing all parts to the action of the scrapers and to provide a scraping device in which it is practically impossible to dislodge a carcass while being acted upon by the beaters.

It is also an important object of this invention to provide a machine in which flexible scraping mechanisms are employed and in which the scraping mechanisms coact with the aforesaid conveying or moving and rotating mechanism for rotating and forcing the carcasses through the machine.

It is also an object of this invention to provide a device of the class specified in which the rotating and moving carcasses are partly submerged in fluid at a suitable temperature whereby the hair, dirt, and refuse is washed off as loosened and in which the carcasses are polished and scraped simultaneously.

It is a further object of this invention to provide a device in which the carcasses are, if necessary, further scalded while being acted upon by the scrapers should they not have been properly scalded in the scalding vat or tank but entirely eliminating the use of spraying and pumping devices. It is also an object of this invention to provide a device in which the carcasses are delivered by gravity to the moving and rotating mechanism and a gravity exit therefor after scraping.

It is a further object of this invention to provide a highly efficient and greatly simplified machine of both small and great capacity and the capacity depending upon the arrangement of the roll and scrapers.

It is finally an object of this invention to provide a durable machine in which delicate mechanisms and parts are entirely avoided and which requires a minimum number of attendants.

The invention consists of the matters hereinafter described and more fully pointed out and defined in the appended claims.

On the drawings: Figure 1 is a longitudinal vertical section of a device embodying my invention, with the scraping mechanisms arranged transversely the travel of the carcass. Fig. 2 is a top plan view thereof.

As shown in the drawings: A, indicates a scalding vat or tank constructed of any suitable material and size and having the rear bottom wall, $a$, thereof inclined upwardly and rearwardly. Journaled in the sides of the tank at the upper and lower ends of said inclined wall $a$, are shafts $a'—a^2$, on which the elevator $a^3$, is supported. Adjacent the rear end of said scalding tank A, is a water tank B, provided with suitable water inlet $b$, and steam or heating fluid inlet $b'$, and with a suitable washout pipe or plug $b^8$. Said tank B, is constructed of sheet metal or any other preferred material and comprises a bottom wall $b^2$, side walls $b^3$, and end walls $b^4—b^5$, of a height, width and length to contain the various mechanisms therein. The wall $b^4$, of the tank B, is placed against the top of the inclined wall $a$, of the scalding vat and is provided with a swinging or automatically closing door $b^6$, above the top of the inclined wall of the scalding tank, which is of a length to admit the hog lengthwise therethrough from the conveyer $a^8$. Rigidly secured to the side walls $b^3$, and end wall $b^4$, of said tank is an inclined platform $b^7$, which extends rearwardly from the bottom of the door opening and the lower end thereof is directed horizontally or at a slight angle upwardly. Journaled in the side walls $b^3$, of said tank B, is a beater shaft C, on which are bolted or otherwise rigidly secured flexible beater arms $c$, constructed of any suitable material such as canvas, chains, rubber or other flexible medium. A flat plate $c'$, of suitable length is secured at the lower end of the beater arms and a curved plate $c^2$, is secured thereagainst by means of rivets or in any other suitable manner which strengthens the lower end of the arms and prevents short bending. Rigidly secured to the outer ends of said beater arms $c$, are a plurality of sets of flexible or rigid blades $c^3—c^4—c^5$, having their outer ends curved outwardly, and, as shown, arranged two abreast but obviously any number may be used in a set.

Journaled in suitable bearings in the side walls $b^3$, below and at the rear of the beater shaft C, is a roll, drum or cylinder D, to which are rigidly secured in any preferred manner bars or plates $d$, of suitable metal or other material, which are shown as angle irons secured to the roller by one flange, and the other flange is directed radially outwardly and parallel the axis of the drum.

It is to be distinctly understood that in the construction shown, any form of roll or drum may be used and either flexible or rigid bars or ribs may be used with any form of drum. The specific construction used depends entirely upon the specific demands of the user, $e. g.$, for a large slaughter house a metal cylinder may be used with steel ribs which are slightly flexible to yield should the machine operate above a given velocity, or a yielding cylinder may be used such as a solid canvas or rubber cylinder, and either yielding or non-yielding ribs. On the other hand, in the smaller plants where one hog is operated on at a time, either a metal or other cylinder may be used with either yielding or non-yielding ribs, and the construction for any user may vary to meet the exigencies of the specific case.

A suitable driving pulley D', is secured to the drum shaft $d^3$, at one end and sprocket wheels $d'—d^2$, are rigidly secured to the beater shaft C, and drum shaft $d^3$, of the drum D, outside and at the opposite side of the tank, and a chain $d^4$, is trained therearound, which drives the beaters.

Above and slightly to the rear of the center of the roll or drum D, just sufficiently for the bars $d$, to pass, is a platform $d^5$, which is shown as horizontal to the end wall $b^5$, of the tank and is then inclined downwardly to deliver the scraped and cleaned carcasses by gravity upon the operating table or bench X.

A partition E, is secured to the side walls $b^3$, of the tank B, above the platform $d^5$, and pivoted thereto is a door $e$, curved toward the opposite end of the tank and rearwardly of its projecting lower edge, said door is provided with a spring latch $e'$, normally locking the door in closed position. A cable or cord $e^2$, trained around suitable pulleys $e^3—e^4—e^5$, is secured to the latch $e'$, and extends within convenient reach of an attendant for opening the door to admit the cleaned carcass through the opening in the end wall $b^5$, upon the platform X, and if desired a suitable strip of flexible material $e^6$, such as canvas or swinging doors may close said exit. The bands, straps or bars are made of material such as steel, rubber or other suitable material, the object of which will be hereinafter described.

The operation is as follows: The hogs, after being suitably scalded in the vat or tank A, are moved upon the elevator $a^3$, which delivers them through the door $b^6$, and the carcasses move by gravity to the end of the platform $b^7$, and upon the roller D. Inasmuch as the bars $d$, are parallel with the axis of the roller upon rotation thereof the bars at each revolution engage the hog and rotate or turn the same continuously. The hog is not moved longitudinally, inasmuch as the roll or drum is not spiral and the scrapers which rotate oppositely from the direction of rotation of the drum whip and scrape the hair and refuse from the carcass as the same is being rotated. The beaters prevent the carcass from being thrown rearwardly from the rotating drum and the rigid door. e, prevents the carcass from being moved by the beaters forwardly beyond the roll, so that at all times the carcass is continuously spinning at a high rate of speed in position for the beaters to act continuously on all parts thereof. The door e has a lower projecting edge which also serves to scrape and dehair the rapidly rotating carcass. The water level in the tank may be any preferred height, but is shown as slightly above the roller D, approximately on a level with the middle of the carcass so that the carcass is lying and rotating in water (which is heated or not, as found necessary) and the beaters acting thereon not only scrape the bristles therefrom, but polish the carcass. After the carcass is thoroughly cleaned, the cord $e^2$, is pulled, releasing the catch and opening the door and the carcass is forced upon the platform $d^5$, and is delivered by gravity upon the operating table or bench X. The cord is released, and the operation repeated.

It is seen that the use of spraying devices and pumps are eliminated, and that the carcass is washed clean as it is rotated continuously in water. Furthermore, should the carcasses not be sufficiently scalded for removal of the bristle, the carcass may again be scalded in the tank as the scrapers act thereon.

Many changes of construction may be varied without departing from the principles of this invention, and I therefore do not desire to limit this application for patent as to details, or otherwise than necessitated by the prior art.

I claim as my invention:

1. In a machine of the class specified a roll or drum adapted to support and rotate a carcass, stationary means adapted to assist said roll or drum in supporting the carcass, and beaters acting upon the carcass as it is rotated.

2. In a scraping machine. mechanism adapted to rotate carcasses, and coacting beaters acting centrifugally and by impact on the rotating carcasses to scrape said carcass and then discharge the same from the machine.

3. In a scraping, polishing and cleaning mechanism, flexible beaters acting downwardly to clean carcasses, means acting to simultaneously turn and support the carcasses, and stationary means adapted to assist said means in supporting the carcasses.

4. In a machine of the class described scraping mechanisms acting downwardly upon the carcasses, means for supporting and rotating said carcasses while being acted upon by the scrapers and a hinged member adapted to prevent the discharge of the carcasses from the machine until the carcass is sufficiently scraped.

5. In a machine of the class described coacting beaters, means acting conjointly to simultaneously turn and scrape carcasses and a movable member adapted to prevent a premature discharge of the carcasses from the machine.

6. In a device of the class described the combination with flexible beaters and means supporting partly submerged carcasses and turning the same continuously while acted upon by the beaters and means adapted to prevent a premature discharge of the carcasses from the machine.

7. In a machine of the class described coacting rotatable mechanisms adapted to simultaneously rotate, support, advance and dehair a carcass, and movable means adapted to retain the carcass in the field of said coacting mechanisms, and when moved to permit discharge of the carcass therebeneath.

8. In a device of the class described, means for supporting and rotating carcasses, stationary means for aiding said means in supporting the carcasses and flexible scraping mechanism acting on the carcass simultaneously as the same is rotated.

9. In a hog scraper, in combination, a rotarily acting device for simultaneously supporting and rotating the carcass in a substantially horizontal position, a horizontal rotating shaft bearing beaters and located above said supporting device and paralleling the length of the carcass, means for retaining the carcass in position to be rotated and acted on by said beaters, and devices for releasing said retaining means to permit said carcass to be thrown out laterally by the conjoint action of said beaters and said rotating supporting means.

10. In a hog scraper, in combination, a rotarily acting device for simultaneously supporting and rotating a carcass, a rotating shaft bearing beaters and located near said supporting device and paralleling the length of the carcass, means for retaining the carcass in position to be rotated and acted on by said beaters, and devices for releasing said retaining means to permit said carcass to be thrown out laterally by the conjoint action of said beaters and said rotating supporting means.

11. In a hog scraper, in combination, a device for simultaneously supporting and rotating a carcass, a rotating shaft bearing beaters and located above said supporting device and paralleling the length of the carcass, means for retaining the carcass in position to be rotated and acted on by said beaters, and devices for releasing said retaining means to permit said carcass to be laterally discharged.

12. In a hog scraper, in combination, a rotatable roll or drum for simultaneously supporting and rotating a carcass in a substantially horizontal position, stationary means for aiding said roll or drum in supporting the carcass, a rotating shaft seated near said supporting device and paralleling the length of the carcass, flexible beaters thereon, means for retaining the carcass in position to be rotated and acted on by said beaters, and devices for releasing said retaining means to permit said carcass to be thrown out laterally by the conjoint action of said beaters and said rotating supporting means.

13. In a device of the class described a tank comprising a bottom and suitable side and end walls, an automatically closing door in one end thereof, an inclined platform extending downwardly therefrom to a point below the normal level of the water in the tank, and then horizontally and slightly upward, a rotatable beater shaft journaled in the side walls of said tank, a rotatable cylinder journaled in the side walls of the tank below and at the rear of the beater shaft, ribs connected therewith and adapted to clear the end of the inclined platform when the cylinder is rotated, a substantially horizontal platform extending inwardly above the normal level of the water to a point above the cylinder, means for simultaneously rotating the beater shaft and ribbed cylinder to permit the same to rotate and scrape the carcass, means for retaining the carcass in position to be rotated and acted on by said beaters, and devices for releasing said retaining means to permit said carcass to be laterally discharged across the horizontal platform by the conjoint action of said beater shaft and rotatable cylinder.

14. In a device of the class described a tank comprising a bottom and suitable side and end walls, an inclined platform extending downwardly from one end thereof to a point toward the bottom, and then horizontally, a rotatable beater shaft journaled in the side walls of said tank, a rotatable cylinder journaled in the side walls of the tank below and at the rear of the beater shaft, a platform extending inwardly above the normal level of the water to a point above the cylinder, means for simultaneously rotating the beater shaft and cylinder to permit the same to rotate and scrape the carcass, means for retaining the carcass in position to be rotated and acted on by said beaters, and devices for releasing said retaining means to permit said carcass to be laterally discharged across the last mentioned platform by the conjoint action of said beater shaft and rotatable cylinder.

15. In a device of the class described a tank comprising a bottom and suitable side and end walls, an inclined platform extending downwardly therefrom, a rotatable beater shaft journaled in the side walls of said tank, flexible beaters thereon, a rotatable cylinder journaled in the side walls of the tank below the beater shaft, ribs connected therewith and adapted to clear the end of the inclined platform when the cylinder is rotated, a platform extending inwardly to a point above the cylinder, means for simultaneously rotating the beater shaft and ribbed cylinder to permit the same to scrape the carcass, means for retaining the carcass in position to be rotated and acted on by said beaters, and devices for releasing said retaining means to permit said carcass to be laterally discharged from the machine.

16. In a device of the class described a tank comprising a bottom and suitable side and end walls, an automatically closing door in one end thereof, an inclined platform extending downwardly therefrom, a rotatable beater shaft journaled in the side walls of said tank, a rotatable cylinder journaled in the side walls of the tank below and at the rear of the beater shaft, ribs connected therewith and adapted to clear the end of the inclined platform when the cylinder is rotated, a substantially horizontal platform extending inwardly above the normal level of the water to a point above the cylinder, and means for simultaneously rotating the beater shaft and ribbed cylinder to permit the same to rotate and scrape a carcass.

17. In a device of the class described a tank comprising a bottom and suitable side and end walls, a rotatable beater shaft journaled in the side walls of said tank, flexible beaters thereon, a rotatable cylinder journaled in the side walls of the tank below and at the rear of the beater shaft, ribs connected therewith, means for simultaneously rotating the beater shaft and ribbed cylinder to permit the same to rotate and scrape the carcass, means for retaining the carcass in position to be rotated and acted on by said beaters, and devices for releasing said retaining means to permit said carcass to be discharged laterally of the machine.

18. In a device of the class described supporting and scraping means for the carcass, scraping means acting conjointly therewith on one side of the carcass, and a movable member on the opposite side of the same adapted to retain the carcass in the field of operation, said member when moved permitting discharge of the carcass.

19. In a device of the class described supporting means for the carcass, scraping means acting thereon, and means adapted to be moved to permit the scraping means to eject the carcass.

20. In a device of the class described rotatable scraping and supporting means for the carcass, revoluble yieldably mounted scraping means mounted above said supporting means, and a movable member adapted to assist in retaining the carcass in the field of operation and when moved permitting the discharge of the carcass by said scraping means.

21. In a hog scraping machine a rotatable supporting roll, resilient scraping means thereon, rotatable resilient scraping means above and to one side thereof, and movable means disposed opposite said latter means adapted to coact with each of said rotating means to retain the carcass therebetween, said movable member when moved permitting the scraping means to eject the carcass.

22. In a device of the class described a plurality of rotatable scraping mechanisms, means acting conjointly therewith to retain the carcass in the field of operation thereof, and means moving said former means to permit one of said scraping mechanisms to eject the carcass beneath said first mentioned means.

23. In a device of the class described a rotatable supporting and scraping means for the carcass, and means acting conjointly therewith to retain the carcass in the field of operation, one of said means movable to permit the discharge of the carcass therebeneath.

24. In a device of the class described dehairing elements for the carcass, and means retaining the carcass in operative engagement with said dehairing elements and movable therefrom to permit the discharge of the carcass therebeneath by said dehairing elements.

25. In a hog scraping machine, a plurality of dehairing elements adapted to rotate the carcass, and a movable dehairing element adapted when moved to permit the carcass to be discharged therebeneath by other of said dehairing elements.

26. In a device of the class described means for supporting, rotating and scraping a carcass independent of grappling means, dehairing elements engaging the same, and means adapted to move one of said elements to permit discharge of the carcass therebeneath by other of said dehairing elements.

27. In a device of the class described means rotating the carcass, and dehairing elements, one mounted to be moved away from the field of operation to permit discharge of the carcass by other of said elements.

28. In a device of the class described a plurality of revolving means adapted to rapidly rotate the carcass, and a dehairing element, movably mounted to permit discharge of the carcass by said revolving means.

29. In a device of the class described a supporting element adapted to rotate the carcass, dehairing elements on each side and above the same to retain the carcass in the field of operation, one of said elements being movable away from the field of operation to permit the carcass to be discharged.

30. In a device of the class described movable supporting means, scraping means and retaining means for the carcass, said retaining means movable relative to said supporting means and scraping means to permit discharge of the carcass therebeneath.

31. In a device of the class described dehairing mechanism for a carcass, a conveyer adapted to elevate the carcass, an inclined stationary guide upon which the carcass is discharged from the conveyer and upon which the carcass moves to said dehairing mechanism, a similar stationary guide to receive an ejected carcass, and mechanism normally retaining a carcass on said dehairing mechanism and shielding said latter stationary guide.

32. In a device of the class described dehairing mechanism for a carcass, movable dehairing means adapted when moved to permit discharge of the carcass and means elevating the carcass and adapting the same to move by gravity into the field of said dehairing mechanism and dehairing means.

33. In a device of the class described a rotatable cylinder adapted to support, rotate and scrape a carcass, other rotatable elements positioned thereabove and adapted to coact therewith to rotate and scrape the carcass, and mechanism adapted to be moved to permit said elements to discharge the carcass.

34. In a device of the class described a plurality of oppositely rotating elements acting to rotate and dehair a carcass, and movable mechanism adapted to be operated to permit the carcass to be discharged by certain of said elements.

In testimony whereof I have hereunto subscribed my name in the presence of two subscribing witnesses.

JOHN W. KOHLHEPP.

Witnesses:
LAWRENCE REIBSTEIN,
CHARLES W. HILLS, Jr.